United States Patent
Kim

(10) Patent No.: US 8,860,986 B2
(45) Date of Patent: Oct. 14, 2014

(54) IMAGE FORMING SYSTEM FOR PRINTING CONTENTS OF A WIDGET APPLICATION EXECUTED IN A MOBILE TERMINAL

(75) Inventor: Dae-hyun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 595 days.

(21) Appl. No.: 13/064,655

(22) Filed: Apr. 6, 2011

(65) Prior Publication Data

US 2012/0044523 A1 Feb. 23, 2012

(30) Foreign Application Priority Data

Aug. 18, 2010 (KR) .................. 10-2010-0079856

(51) Int. Cl.
*G06F 3/12* (2006.01)

(52) U.S. Cl.
CPC ............ *G06F 3/1292* (2013.01); *G06F 3/1288* (2013.01); *G06F 3/1247* (2013.01); *G06F 3/1256* (2013.01); *G06F 3/1206* (2013.01)
USPC ...................................................... 358/1.15

(58) Field of Classification Search
CPC ... G06F 3/1208; G06F 3/1256; G06F 3/1288; G06F 3/1292
USPC ........................................................ 358/1.15
See application file for complete search history.

(56) References Cited

U.S. PATENT DOCUMENTS

| | | | | |
|---|---|---|---|---|
| 5,832,218 A | * | 11/1998 | Gibbs et al. | 709/203 |
| 6,922,258 B2 | | 7/2005 | Pineau | |
| 2003/0117642 A1 | * | 6/2003 | Haraguchi | 358/1.15 |
| 2005/0200637 A1 | | 9/2005 | Silverbrook et al. | |
| 2008/0004021 A1 | * | 1/2008 | Sanjay | 455/436 |
| 2008/0079996 A1 | * | 4/2008 | Sasaki | 358/1.15 |
| 2008/0198400 A1 | * | 8/2008 | Solcz | 358/1.15 |
| 2009/0288128 A1 | * | 11/2009 | Oida et al. | 725/112 |
| 2009/0316167 A1 | * | 12/2009 | Sato et al. | 358/1.9 |
| 2010/0134827 A1 | * | 6/2010 | Weber et al. | 358/1.15 |
| 2012/0317007 A1 | * | 12/2012 | Kino | 705/34 |
| 2013/0063783 A1 | * | 3/2013 | Yamaguchi et al. | 358/1.15 |

FOREIGN PATENT DOCUMENTS

KR 10-2008-0046287 5/2008

* cited by examiner

*Primary Examiner* — Eric A Rust
(74) *Attorney, Agent, or Firm* — Staas & Halsey LLP

(57) ABSTRACT

An image forming system to print contents of a widget application executed in a terminal, including: the terminal to display a widget screen by executing the widget application, to display content of which a preview is requested in the displayed widget screen, and to request printing of the displayed content; a widget server to receive raw data of the content from the outside and to process the received raw data to preview data or print data; and an image forming device to print the content in response to a print request of the content.

14 Claims, 6 Drawing Sheets

IMAGE FORMING SYSTEM FOR PRINTING CONTENTS OF A WIDGET APPLICATION EXECUTED IN A MOBILE TERMINAL

CROSS-REFERENCE TO RELATED APPLICATIONS

This application claims the benefit of Korean Patent Application No. 10-2010-0079856, filed on Aug. 18, 2010, in the Korean Intellectual Property Office, the disclosure of which is incorporated herein in its entirety by reference.

BACKGROUND

1. Field

The present general inventive concept relates to an image forming system for printing contents of a widget application executed in a terminal.

2. Description of the Related Art

A widget is a program for displaying software that is frequently used by a user or that needs to be easily accessed on a specific area of a screen and for allowing the software to be executed or to be maintained on standby. A widget can be quickly executed by a user's selection and may perform a function of receiving information over the Internet without requiring a separate input or opening a web browser and a function of displaying the information. At present, various widgets have been developed and publicized, thereby providing many convenient functions, such as a clock function, a calendar function, a search window function, a map function, a news function, a weather function, etc., provided by a web browser or specific application programs to a user without using the web browser or a corresponding application program. Due to such convenience provided by a widget, widgets are briskly provided to even terminals such as a smart phone, and since contents requiring printing exist among contents of a widget executed in a smart phone, a method of conveniently printing contents of a widget executed in a smart phone in an image forming device without being limited to time or space is required.

SUMMARY

The present general inventive concept provides an image forming system for printing contents of a widget application executed in a terminal, by which contents of a widget executed in a terminal can be conveniently printed.

According to an aspect, there is provided an image forming system for printing contents of a widget application executed in a terminal, including: the terminal to display a widget screen by executing the widget application, to display content of which a preview is requested in the displayed widget screen, and to request printing of the displayed content; a widget server to receive raw data of the content from the outside and processing the received raw data to preview data or print data; and an image forming device to print the content in response to a print request of the content.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

The present general inventive concept will now be described more fully with reference to the accompanying drawings, in which exemplary embodiments of the present general inventive concept are shown.

Figure 1:
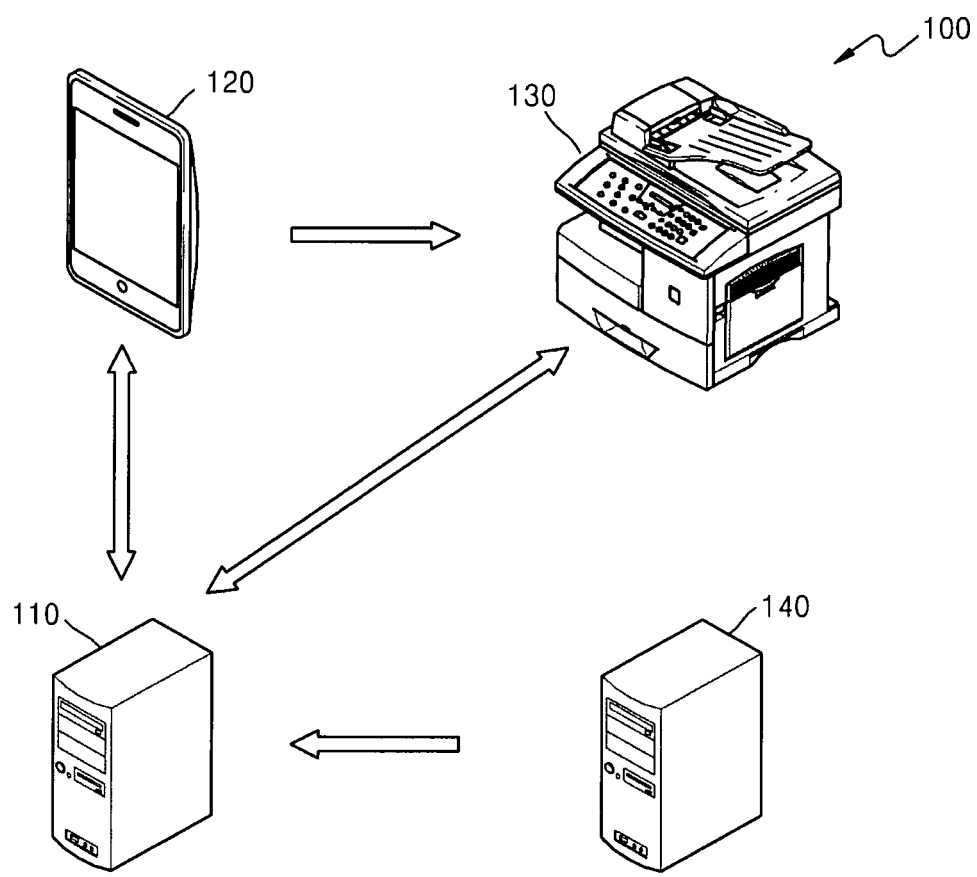
FIG. 1 is a schematic diagram of a structure of an image forming system according to a first exemplary embodiment.

FIG. 1 is a schematic diagram of a structure of an image forming system 100 according to a first exemplary embodiment. Referring to FIG. 1, the image forming system 100 includes a widget server 110, a terminal 120, an image forming device 130, and a content provider 140.

The widget server 110 receives raw data of content used in a widget application executed in the terminal 120 from the content provider 140, and processes the raw data of the content into data that may be previewed in the terminal 120, and stores the preview data, or processes the raw data of the content into data that can be printed in the image forming device 130, and stores the print data. A widget screen obtained by executing the widget application is displayed on the terminal 120, and a user can confirm preview content by requesting a preview of specific content on the widget screen and print the content in the image forming device 130 by requesting printing of the content. The terminal 120 may be a smart phone for executing a widget application desired by a user.

Figure 2:
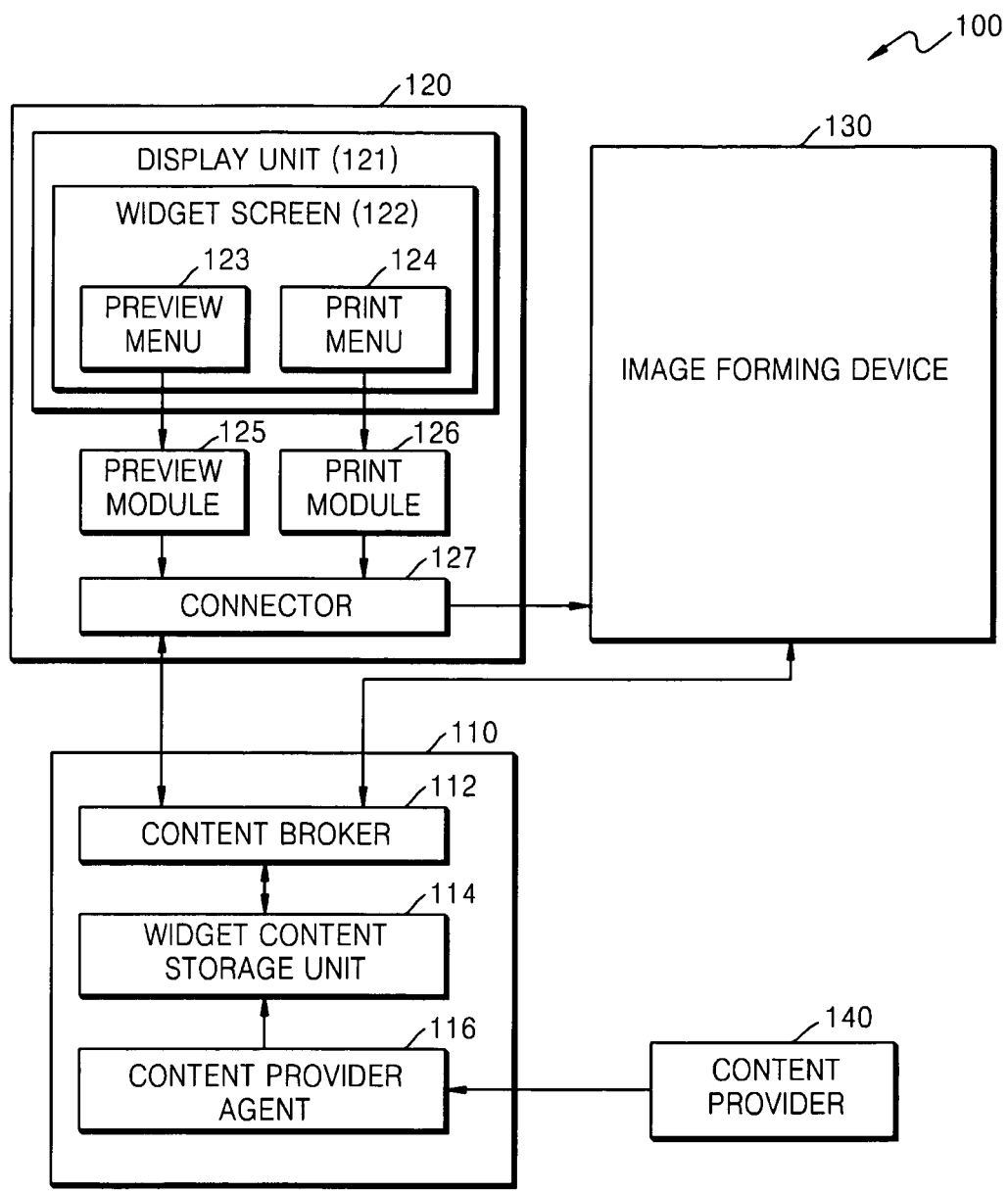
FIG. 2 is a block diagram of devices forming the image forming system according to the first exemplary embodiment.

FIG. 2 is a block diagram of devices forming the image forming system 100 according to the first exemplary embodiment. An operation of the image forming system 100 according to an exemplary embodiment will now be described with reference to FIG. 2.

The widget server 110 stores contents used in a widget application executed in the terminal 120. According to an exemplary embodiment, the widget server 110 includes a content broker 112, a widget content storage unit 114, and a content provider agent 116. The content provider agent 116 of the widget server 110 receives raw data of content from the content provider 140. At this time, the content provider agent 116 receives raw data of content in real-time or in a predetermined time interval. The content provider 140 is a server for providing raw data of content used in a widget application executed in the terminal 120, and a server of a developer that develops the widget application is generally used as the content provider 140 but the present embodiment is not necessarily limited to this, and any server providing raw data of content used in a widget application can be the content provider 140. The content provider agent 116 processes the raw data provided from the content provider 140 into preview data or print data and stores the preview data or print data in the widget content storage unit 114. According to an exemplary embodiment of the present general inventive concept, the preview data can be data such as text or an image, and the print data can be Page Description Language (PDL), which is a language that describes the appearance of a printed page, data such as PCL/PS, Extensible HyperText Markup Language (XHTML)-Print data used in Digital Living Network Alliance (DLNA) printing, or preview data. If a widget application is executed in the terminal 120, a widget screen 122 is displayed on a display unit 121 of the terminal 120. According to an exemplary embodiment of the present general inventive concept, as shown in FIG. 2, although one widget screen is displayed by executing one widget application, when a plurality of widget applications are executed, a plurality of widget screens are displayed on a display unit. According to an exemplary embodiment, a preview menu 123 for requesting a preview of content and a print menu 124 for requesting printing of content are embodied on the widget screen 122 displayed on the display unit 121. Thus, a user can request preview or printing of content of a widget application by selecting the preview menu 123 or the print menu 124 embodied on the widget screen 122. When a plurality of widget screens are displayed on the display unit, preview or printing of content of a widget application can be requested on each widget screen. If a user selects the preview menu 123 on the widget screen 122 displayed on the display unit 121, a preview module 125 receives a preview request of content of a widget application. Upon reception of the preview request, the preview module 125 requests the content from the widget server 110 through a connector 127 with reference to content information stored in the widget application. Here, the content information includes a location or type of the content. The connector 127 denotes a communication means by which a user may deliver specific information of the terminal 120 to the outside. The connector 127 includes a physical device, such as wired/wireless network, USB, or Bluetooth, and a communication protocol, such as TCP/IP or HTTP, for data transmission. Upon reception of the content request, the content broker 112 of the widget server 110 responds to the preview module 125 of the terminal 120 by securing the requested preview content from the widget content storage unit 114. Here, the content broker 112 includes a protocol, such as TCP/IP or HTTP, used for communication data access. The preview module 125 of the terminal 120 previews the preview content secured from the widget server 110 on the display unit 121. In this case, if the content is an image or text, the content is displayed, and if the content is a moving picture, the content is played back. The user confirms the preview content, and if the user desires to print the content, the user requests printing of the content by selecting the print menu 124 displayed on the widget screen 122. According to the selection of the print menu 124, if the printing request is received, a printing module 126 operates.

Figure 3:
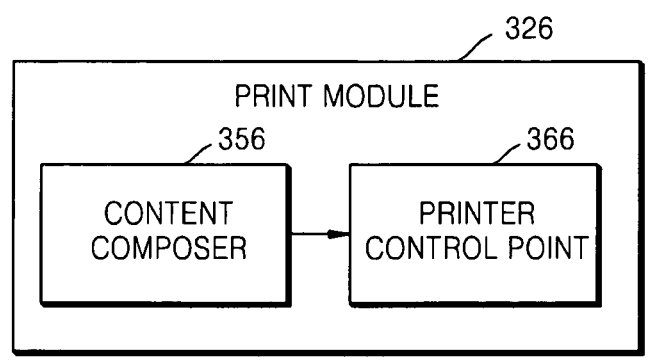
FIG. 3 is a block diagram of a print module of a terminal according to the first exemplary embodiment.

FIG. 3 is a block diagram of a print module of a terminal according to the first exemplary embodiment. With reference to a structure of the print module of a terminal shown in FIG. 3, an operation of the image forming system 100 shown in FIG. 2 will now be described. A print module 326 of a terminal according to the first exemplary embodiment of the present general inventive concept includes a content composer 356 and a printer control point 366. The printer control point 366 searches for an image forming device connected to the terminal 120. The print module 326 of a terminal according to the first exemplary embodiment of the present general inventive concept operates in a Digital Living Network Alliance (DLNA) environment. Thus, the printer control point 366 searches for a printable digital media printer (DMPr) connected to the terminal 120. The content composer 356 generates a print instruction for DLNA printing by using location information of content included in a widget application. The generated print instruction is delivered to the printer control point 366, and the printer control point 366 transmits the print instruction to an image forming device found through the connector 127. Here, the print instruction generated by the content composer 356 has a type of "CreateJobURI( )". Upon reception of the print instruction, the image forming device 130 requests the content from the widget server 110 with reference to the print instruction. The content broker 112 of the widget server 110 secures the requested content from the widget content storage unit 114 and transmits the secured content to the image forming device 130. Here, the transmitted content has a type of "XHTML-Print" or "JPEG". The image forming device 130 prints the received content.

Figure 4:
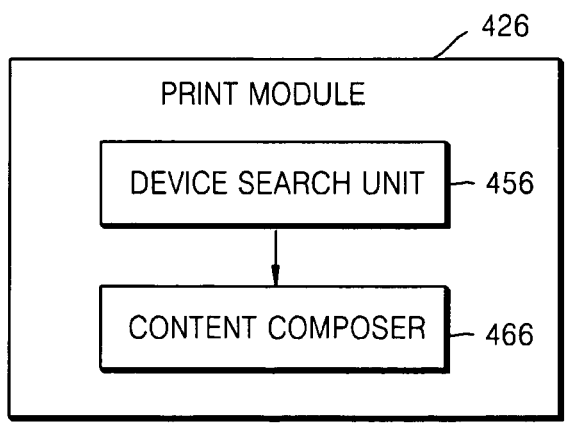
FIG. 4 is a block diagram of a print module of a terminal according to a second exemplary embodiment.

FIG. 4 is a block diagram of a print module of a terminal according to a second exemplary embodiment. With respect to a structure of the print module of a terminal shown in FIG. 4, an operation of the image forming system 100 shown in FIG. 2 will now be described. A print module 426 of a terminal according to the second exemplary embodiment of the present general inventive concept includes a device search unit 456 and a content composer 466. The device search unit 456 searches for an image forming device for printing according to a print instruction requested by the terminal 120. At this time, to search for an image forming device, a method of directly inputting an IP of an image forming device or automatically searching for an image forming device may be used. For an application of automatically searching for an image forming device, UPnP or BONJOUR print services applications may be used. Here, the searched image forming device is an image forming device performing "full printing". The content composer 466 can generate "Reference Printing Information" with a print instruction by using reference information included in content information. Upon reception of the print instruction, the image forming device 130 requests content from the widget server 110 with reference to the print instruction. The content broker 112 of the widget server 110 secures the requested content from the widget content storage unit 114 and transmits the secured content to the image forming device 130. Here, the transmitted content is "PDL data" having a type of "PCL" or "PS". The image forming device 130 prints the received content.

Figure 5:
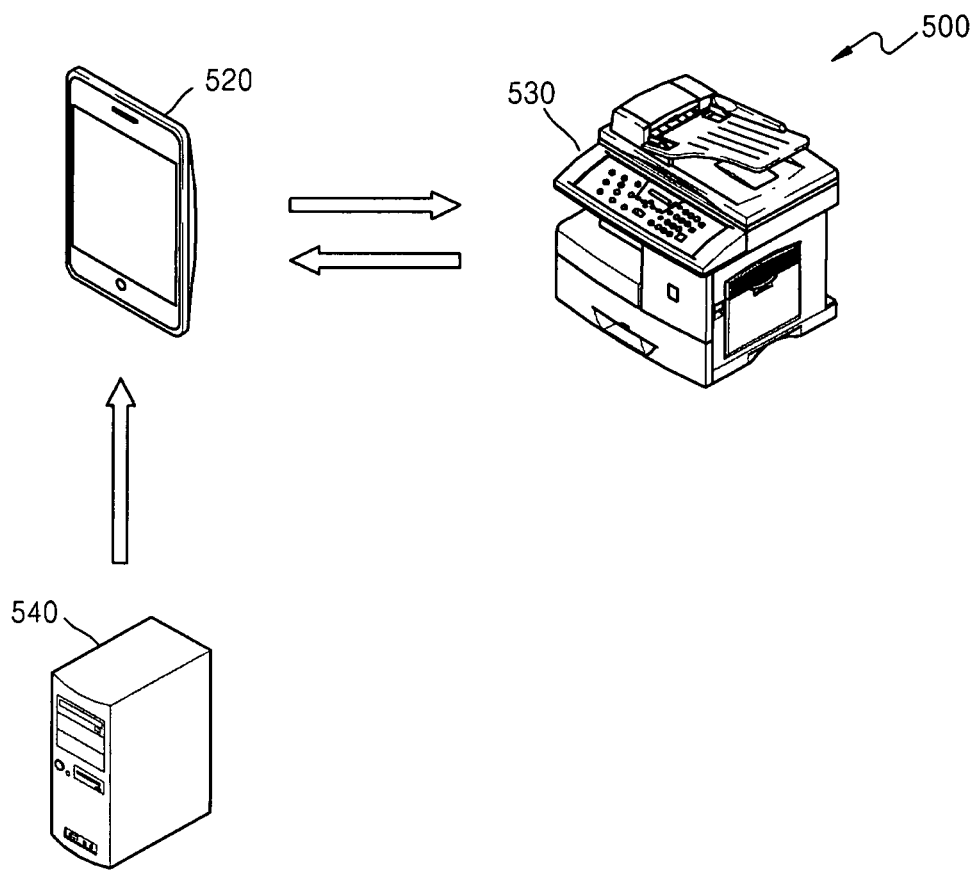
FIG. 5 is a schematic diagram of a structure of an image forming system according to the second exemplary embodiment.

FIG. 5 is a schematic diagram of a structure of an image forming system according to the second exemplary embodiment. An image forming system 500 according to an exemplary embodiment includes a terminal 520, an image forming device 530, and a content provider 540.

Compared with the structure of the image forming system illustrated in FIG. 1, the image forming system 500 illustrated in FIG. 5 has a feature of loading a function of a widget server in a terminal.

Thus, the terminal 520 receives raw data of content used in a widget application executed in the terminal 520 from the content provider 540, and processes the raw data of the content into data that can be previewed in the terminal 520, and stores the preview data, or processes the raw data of the content into data that can be printed in the image forming device 530, and stores the print data. A widget screen obtained by executing the widget application is displayed on the terminal 520, and a user can confirm preview content by requesting a preview of specific content on the widget screen and print the content in the image forming device 530 by requesting printing of the content. The terminal 520 may be a smart phone for executing a widget application desired by a user.

Figure 6:
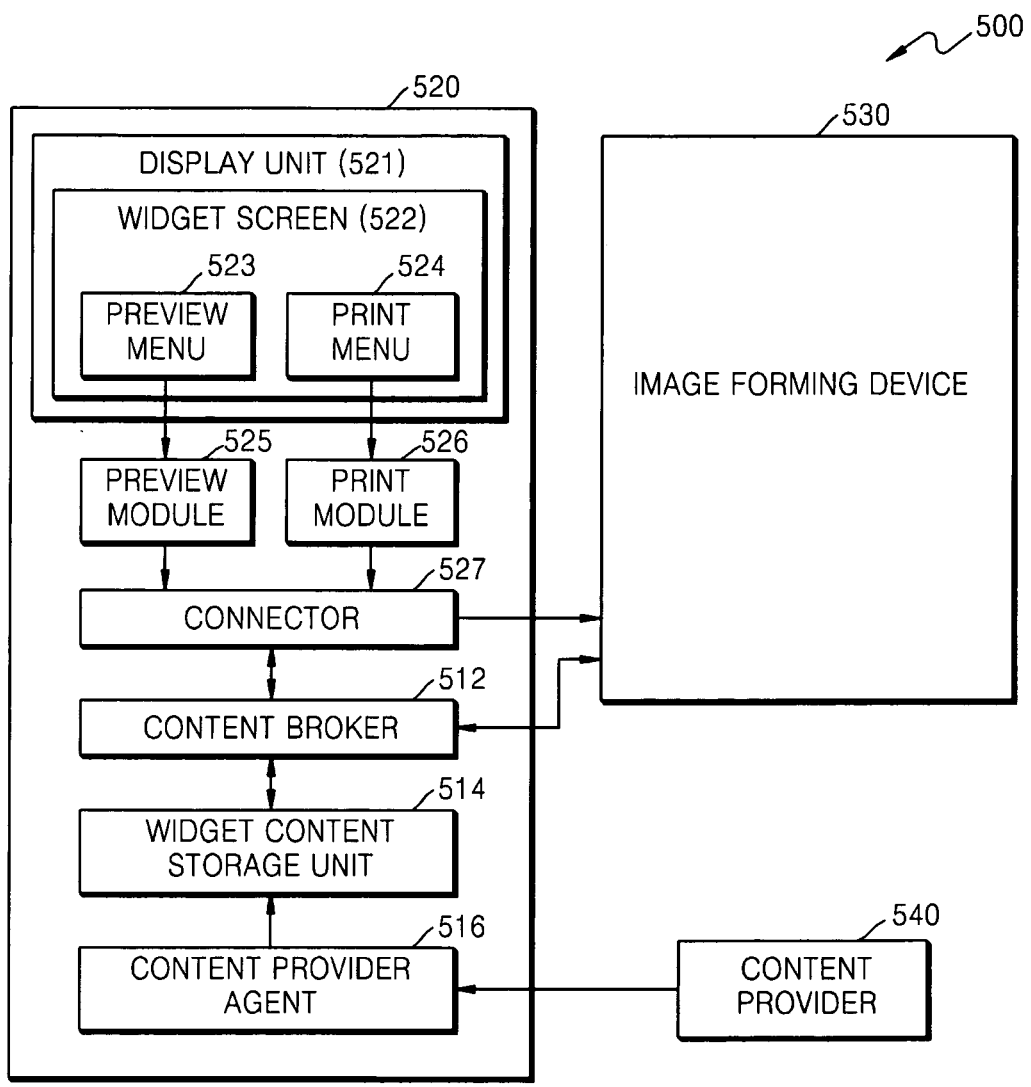
FIG. 6 is a block diagram of devices forming the image forming system according to the second exemplary embodiment.

FIG. 6 is a block diagram of devices forming the image forming system 500 according to the second exemplary embodiment. An operation of the image forming system 500 according to the second exemplary embodiment will now be described with reference to FIG. 6.

Comparing the image forming system 500 illustrated in FIG. 6 with the image forming system 100 illustrated in FIG. 2, the image forming system 500 illustrated in FIG. 6 has a feature of loading a function of a widget server in a terminal. An image forming device of the image forming system 500 illustrated in FIG. 6 is a Digital Media Printer (DMPr) operating in a DLNA environment.

Thus, the image forming system 500 illustrated in FIG. 6 operates in the same way as the image forming system 100 illustrated in FIG. 2 and is different from the image forming system 100 illustrated in FIG. 2 in that a content broker 512 of the terminal 520 uses an internal communication means, such as Internal Process Communication (IPC) or Function call, without using an external communication protocol, such as TCP/IP or HTTP, for communication with a connector 527.

Figure 7:
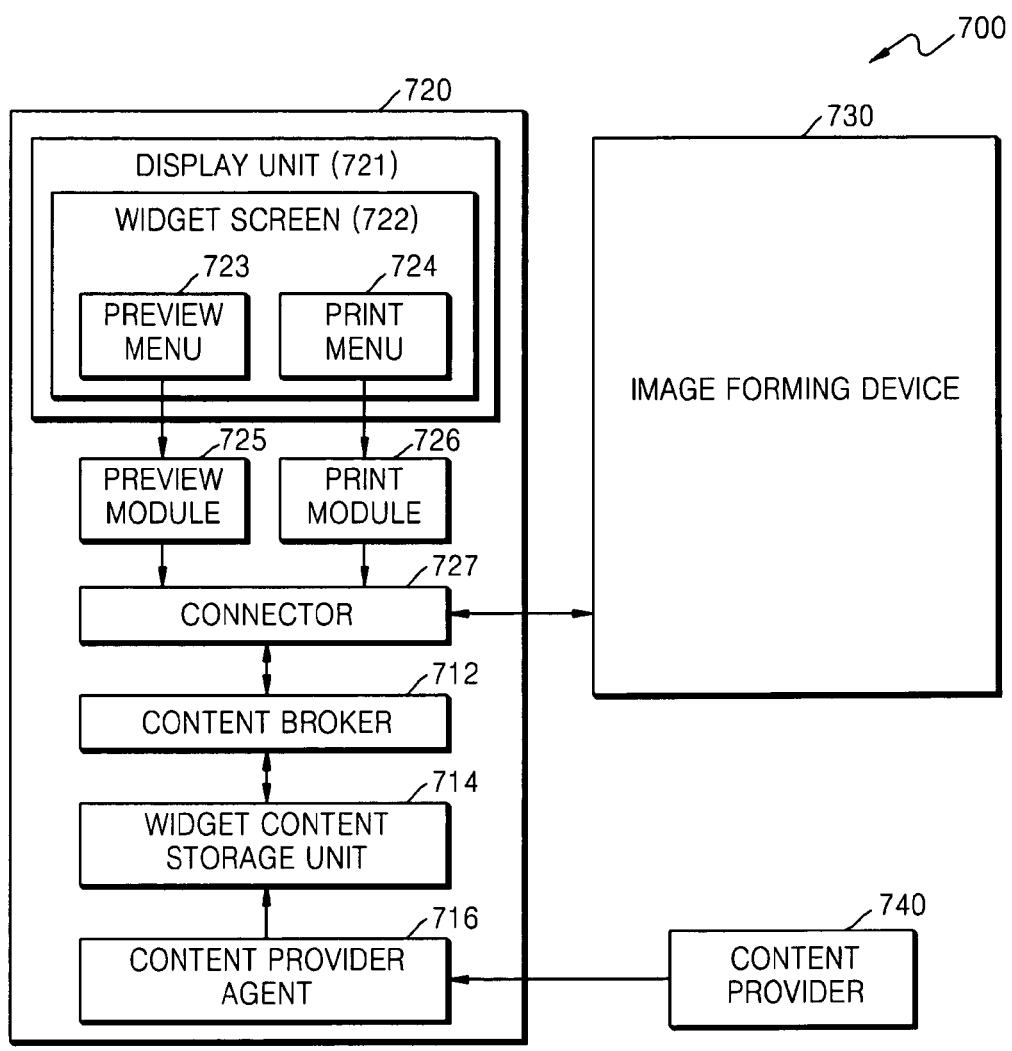
FIG. 7 is a block diagram of devices forming an image forming system according to a third exemplary embodiment.

FIG. 7 is a block diagram of devices forming an image forming system according to a third exemplary embodiment. An operation of an image forming system 700 according to the third exemplary embodiment of the present general inventive concept will now be described with reference to FIG. 7.

Comparing the image forming system 700 illustrated in FIG. 7 with the image forming system 500 illustrated in FIG. 5, an image forming device 730 of the image forming system 700 illustrated in FIG. 7 is different from the image forming system 500 illustrated in FIG. 5 in that PDL full printing is performed.

Thus, the image forming system 700 illustrated in FIG. 7 operates in the same way as the image forming system 500 illustrated in FIG. 6, and a print module 726 of a terminal 720 transforms content of a widget application into print data such as PDL data, and transmits the transformed PDL data to the image forming device 730 through a connector 727. Accordingly, the image forming device 730 prints the received PDL data.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. An image forming system for printing contents of a widget application executed in a terminal, comprising:
   the terminal to display a widget screen by executing the widget application, to display preview data associated with content of which a preview is requested in the displayed widget screen, and to request printing of print data associated with the content;
   a widget server to receive raw data of the content from outside and to process the received raw data into the preview data and/or the print data; and
   an image forming device to print the content print data in response to a print request of the content,
   wherein the terminal comprises a print module to search for the image forming device according to the print request of the content and to transmit a print instruction, according to the print request, to the image forming device,
   wherein the image forming device requests the print data from the widget server with reference to the received print instruction, receives the requested print data from the widget server, and prints the received print data, and
   wherein the terminal is a smart phone.

2. The image forming system of claim 1, wherein the image forming device receives the print data from the widget server and prints the received content.

3. The image forming system of claim 1, wherein the terminal comprises:
   a display unit to display the widget screen;
   a connector to perform communication with the widget server and the image forming device; and
   a preview module to receive preview data from the widget server through the connector according to a preview request of the preview data and to display the preview data on the display unit.

4. The image forming system of claim 3, wherein the print module comprises:
   a content composer to generate a print instruction for printing by using location information of the content included in the widget application; and
   a printer control point to search for a digital media printer connected to the terminal and to transmit the generated print instruction to a found printer through the connector.

5. The image forming system of claim 4, wherein the print data received from the widget server includes Extensible HyperText Markup Language (XHTML) print data.

6. The image forming system of claim 3, wherein the print module operates in a full printing environment and comprises:
   a device search unit to search for an image forming device connected to the terminal by using an Internet Protocol (IP) input or an application for performing an automatic research; and
   a content composer to generate a print instruction using reference information of content included in the widget application and to transmit the generated print instruction through the connector.

7. The image forming system of claim 6, wherein the print data received from the widget server includes page description language (PDL) data.

8. The image forming system of claim 6, wherein the application for performing an automatic search is a general method for discovering services on a local area network.

9. The image forming system of claim 1, wherein the widget server comprises:
   a content provider agent to receive raw data of the content from a content provider;
   a widget content storage unit to process the received raw data of the content into preview data or print data and to store the preview data or the print data; and
   a content broker to provide the preview data to the terminal or to provide the print data to the image forming device.

10. The image forming system of claim 1, wherein the preview data is a text information and/or an image data, and wherein the print data is page description language (PDL) data.

11. A method of operating an image forming system for printing contents of a widget application executed in a terminal, comprising:
   displaying a widget screen on a display screen of the terminal including displaying preview data associated with content on the display screen, by executing the widget application;
   searching for an image forming device, using the terminal, according to a print request of the content, wherein the terminal is a smart phone;
   transmitting a print instruction, using the terminal, according to the print request of the content, to the image forming device;

requesting, using the image forming device, the content from a widget server with reference to the received print instruction;

receiving, using a widget server, raw data of the content from outside;

processing, using the widget server, the received raw data of the content into print data of the content;

receiving, using the image forming device, the print data of the content from the widget server; and printing, using the image forming device, the received print data of the content.

12. The method of claim 11, further comprises:

in response to a request in the displayed widget screen;

processing, using the widget server, the received raw data of the content into the preview data of the content; and receiving the preview data of the content form the widget server.

13. The method of claim 11, further comprising:

storing the print data of the content by using the widget server.

14. The method of claim 11, wherein the preview data is a text information and/or an image data, and wherein the print data is page description language (PDL) data.

* * * * *